United States Patent [19]
Bennett

[11] Patent Number: 5,590,299
[45] Date of Patent: Dec. 31, 1996

[54] MULTIPROCESSOR SYSTEM BUS PROTOCOL FOR OPTIMIZED ACCESSING OF INTERLEAVED STORAGE MODULES

[75] Inventor: Brian R. Bennett, Laguna Niguel, Calif.

[73] Assignee: AST Research, Inc., Irvine, Calif.

[21] Appl. No.: 331,290

[22] Filed: Oct. 28, 1994

[51] Int. Cl.⁶ .................................................. G06F 12/00
[52] U.S. Cl. .......................................... 395/405; 395/484
[58] Field of Search ........................... 395/405, 497.03, 395/497.04, 484, 497.04, 287, 294

[56] References Cited

U.S. PATENT DOCUMENTS

| | | | |
|---|---|---|---|
| 4,669,056 | 5/1987 | Waldecker et al. | 395/294 |
| 4,797,815 | 1/1989 | Moore | 395/289 |
| 4,933,846 | 6/1990 | Humphrey et al. | 395/478 |
| 5,005,151 | 4/1991 | Kurkowski | 395/856 |
| 5,043,874 | 8/1991 | Gagliardo et al. | 395/287 |
| 5,257,356 | 10/1993 | Brockmann et al. | 395/290 |
| 5,274,788 | 12/1993 | Koike | 395/484 |
| 5,287,477 | 2/1994 | Johnson et al. | 395/484 |
| 5,323,489 | 6/1994 | Bird | 395/494 |
| 5,341,486 | 8/1994 | Castle | 395/405 |
| 5,446,847 | 8/1995 | Keeley et al. | 395/280 |

OTHER PUBLICATIONS

Bennett, Brian, Break The Performance Bottlenecks In Today's Multiprocessor Designs—Jul. 7, 1994—pp. 113–120—The Design Magazine of the Electronics Industry.

Primary Examiner—Jack A. Lane
Attorney, Agent, or Firm—Knobbe, Martens, Olson & Bear

[57] ABSTRACT

A multiprocessor information processing system has a system bus with interleaved memory modules in communication with multiple CPUs. The multiprocessor system includes a subsystem monitoring circuit which monitors the addresses requested by the local CPU. If the local CPU addresses a memory module which is different from the last accessed memory module, then the subsystem monitoring circuit initiates a request to maintain control of the system bus. In this manner, sequential write and read operations are typically made to interleaved memory modules so that the effects of module recovery time are minimized. The subsystem monitoring circuit includes a transfer count register which indicates how many data transfer cycles can be run in succession before the local CPU has to relinquish control of the system bus. In this manner, fair arbitration is assured for other CPUs contending for control of the system bus.

7 Claims, 6 Drawing Sheets

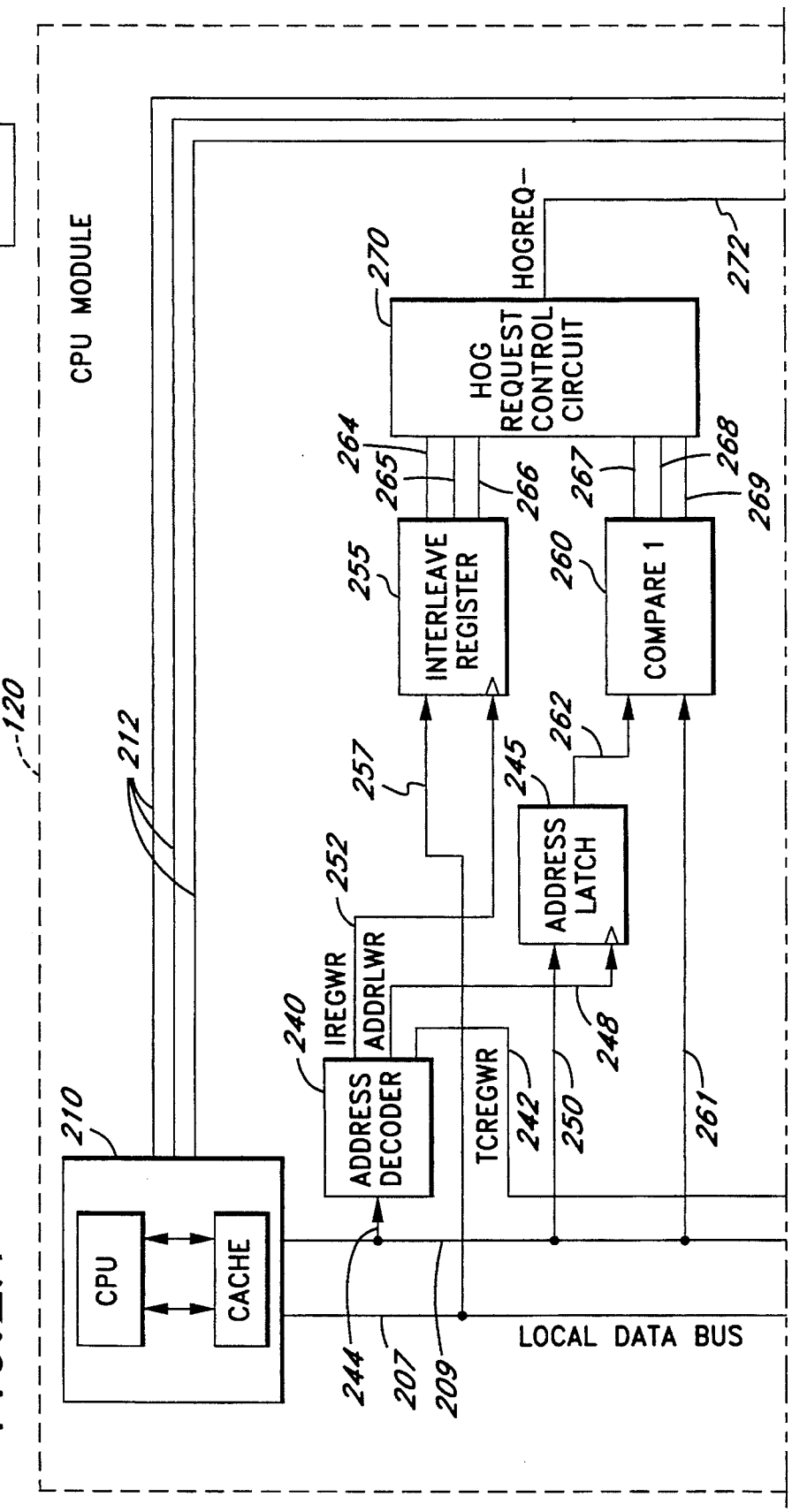

MULTIPROCESSOR SYSTEM BUS PROTOCOL FOR OPTIMIZED ACCESSING OF INTERLEAVED STORAGE MODULES

BACKGROUND OF THE INVENTION

1. Field of the Invention

The present invention relates to the operation of a communication bus in a multiprocessor computer system and, more specifically, to a bus protocol accessing interleaved memory modules.

2. Description of the Related Art

Due to the demand for increased processing speed and volume, many computer systems, and other information processing systems, employ multiple central processing units (CPUs). Typically, in such multiprocessor systems, multiple CPUs communicate with memory modules, input/output (I/O) devices, and other peripheral units, via a main system bus. Since the bus can only be used by one processor at a time, such multiprocessor systems typically use a bus protocol that determines which processors have control of the bus at any given time.

Within a typical multiprocessor system, the bus protocol calls for the bus to be in one of four phases, or states. In an inactive, or bus free state, none of the CPUs control the bus or are vying for control of the bus. The bus enters an arbitration state when one or more of the CPUs indicates that one of the memory modules, or other units accessible on the bus, is to be accessed. In the arbitration state, the CPUs competing for control of the system bus determine which CPU should gain control of the bus based upon the priority of the requests issued by the respective CPUs. Control of the bus is granted to one of the CPUs in a selection state. Once control of the bus has been granted to one of the CPUs, the bus enters an active, or data/control state wherein data and control signals are transferred over the bus to other units in communication with the bus.

Data bus width and clock speed are the bus parameters which are usually considered when measuring bus performance. However, in order to increase processing speed and volume, bus efficiency must be considered in addition to these parameters. That is, when a CPU has control of the bus, there is often some dead time wherein no data is being transferred along the bus. The efficiency of the bus decreases when dead time as a percentage of the time the CPU has control of the bus increases.

One of the main causes of bus inefficiency is the delay observed when a memory module has to recover data for successive CPU requests. When a first request is issued to a memory module, the module is generally in a ready state so that the memory module can access data with little delay (usually within one clock cycle). However, if the same memory module is immediately accessed again, the module typically will exhibit a delay before transferring data. This delay is typically called "recovery time." While the memory module is accessing data, no data is transferred across the system bus during the recovery time period. Thus, bus efficiency is decreased whenever successive requests are made to the same memory module.

One way to improve bus efficiency involves interleaving the memory addresses within the memory modules on a system bus. When memory modules are interleaved, successive memory storage locations (i.e., memory locations having consecutive addresses) are placed in separate memory modules. Since associated data is typically stored in successive memory storage locations, and a group of associated data is likely to be accessed at once, it is likely that a CPU will access several successive memory locations in a row for a typical memory access. By placing successive memory locations in separate memory modules, the effects of recovery time delay for a given memory module are reduced. This is because a CPU will typically request data from one memory module, and then request the next address, which is stored in another memory module, and so on, so that each memory module is given a chance to recover from the last request. Thus, interleaving memory modules has been found to be an effective way of increasing bus efficiency.

In multiprocessor systems, however, memory interleaving is typically not as effective. This is because the system bus must share multiple CPUs, and each CPU has an opportunity to vie for control of the system bus after each data transaction. That is, the system bus usually enters the arbitration state whenever more than one CPU has a request to fill. In a typical case, a first CPU may access successive memory locations (and hence, different memory modules) if it maintains control of the system bus, however, when a second CPU is granted control of the bus, the data requested by the second CPU will usually have no relation to the data requests of the first CPU. Thus, there is no way of assuring that a different memory module than the memory module just accessed by the first CPU will be accessed by the second CPU. This may result in bus inefficiency due to the recovery time when the same memory module is accessed by the second CPU. In this way, the benefits of memory interleaving may be severely compromised.

Some systems have attempted to compensate for the bus inefficiency associated with multiprocessor systems. For example, U.S. Pat. No. 4,669,056 entitled DATA PROCESSING SYSTEM WITH A PLURALITY OF PROCESSORS ACCESSING A COMMON BUS TO INTERLEAVED MEMORY STORAGE, to Waldecker, discloses a method of increasing system bus efficiency. In the Waldecker patent, the addresses accessed by each of the CPUs are selected so that when control of the bus is switched to another CPU, a memory request is assured of going to a different memory module than that accessed by the previous CPU. However, this method will not operate in conjunction with a conventional CPU (e.g., an INTEL CPU). Even if such a device were to be implemented within a CPU having pipelining capabilities, it appears that additional data buffer circuitry would be required to accommodate address requests which were not in the proper order to assure proper interleaving.

In another system, disclosed in U.S. Pat. No. 5,287,477 entitled MEMORY-RESOURCE-DRIVEN ARBITRATION, to Johnson, et al., special memory status queues hold information regarding the status of each of the interleaved memory modules in communication with the system bus. The master devices on the system bus (e.g., the CPUs) monitor the local memory status queue in order to determine which of the memory modules are busy. Those master devices which have pending requests for busy memory modules are inhibited from arbitrating for control of the system bus. However, such an implementation requires that master devices having requests to ready memory modules rearbitrate for control of the bus. This may cause system bus inefficiencies since the arbitration and selection states of the bus must be re-entered, and in these states no data or control signals are transferred over the system bus. Furthermore special queues are necessary to implement such a system.

SUMMARY OF THE INVENTION

The present invention provides an apparatus and method for improving bus efficiency in a memory interleaved, multiprocessor system. A cache line interleave memory subsystem monitors pending addresses from the processor units waiting to access the system bus. If the pending addresses in the CPU which has control of the system bus is to an idle memory module (i.e., a memory module which is immediately ready to process a memory request), then the subsystem circuit of the present invention allows the CPU to maintain control of the bus ("bus hogging"). Once the CPU in control of the bus has a pending address request to a busy memory module, other CPUs on the system bus are able to vie for control of the bus in the arbitration phase. A counter circuit keeps track of the number of sequential cycles which a CPU has run while "hogging the bus." In the event that the number of cycles in which the same CPU has control of the bus exceeds a designated value, the subsystem causes the system bus to enter the arbitration state to insure that other processing performance factors are not compromised.

A multiprocessor information processing circuit has multiple interleaved memory modules. The circuit comprises a system bus; first and second interleaved memory modules in communication with the system bus; and first and second central processing unit (CPU) modules in communication with the interleaved memory modules via the system bus. Each of the modules comprises a CPU and a cache memory, wherein the CPU generates address requests for accessing selective ones of the interleaved memory modules, and transmits and receives data to and from the interleaved memory modules; an address decoder circuit in communication with the CPU and cache memory, wherein the address control circuit receives address and control data indicative of the presence of a pending address request generated by the CPU. The address and control data further indicates the number of the interleaved memory modules on the system bus. Each of the modules further comprises an address latch circuit which latches pending addresses generated by the CPU in response to a command from the address decoder circuit; an address comparator circuit which compares addresses output by the address latch circuit and the pending address requested by the CPU; an interleave register which receives data that indicates the number of the interleaved memory modules on the system bus from the address decoder; control circuitry which receives inputs from the address comparator circuit and the interleave register and, based upon the inputs, generates a signal requesting control of the system bus when the pending address request is issued to a different memory module from the memory module accessed by the previous address request issued by the CPU; and a bus controller which receives the signal generated by the control circuitry and causes the CPU module to retain control of the system bus when the control circuitry requests control of the system bus, or releases control of the system bus when the control circuitry does not request control of the system bus.

In a preferred embodiment, the CPU modules of the multiprocessor circuit further comprise a transfer count register which stores a transfer count value as determined by the address decoder; a transfer counter which stores a counter value that is incremented each time a data transfer cycle is performed between the CPU and one of the interleaved memory modules; and a transfer count comparator circuit which compares the transfer count value stored in the transfer count register and the counter value stored in the transfer counter, and provides a terminate control signal to the bus controller if the counter value is equal to the transfer count value.

Under another aspect, the present invention provides a monitoring subcircuit for use in a processor module within a multiprocessor system having a system bus in communication with interleaved memory modules. The processor module generates address requests on the system bus for accessing selected ones of the interleaved memory modules. The monitoring subcircuit comprises an address locator circuit which determines if a pending address request generated by the processor module is directed to a memory module which received an immediately preceding address request generated by the processor module; and a control circuit which indicates that the processor module should retain control of the system bus when the address locator circuit determines that the pending address request is directed to accessing a different memory module than the memory module which received the immediately preceding address request generated by the processor module.

In a preferred embodiment, the monitoring subcircuit further comprises a terminate control circuit which generates a signal indicating that the processor module should release control of the bus once the processor module has run a maximum number of consecutive data transfers without relinquishing control of the system bus.

Under yet another aspect, the present invention provides a multiprocessor information processing system which comprises a system bus; a plurality of memory modules in communication with the system bus; and a plurality of processing modules. Each of the processing modules includes a subcircuit which monitors addresses requested by the processing modules, and wherein the subcircuit grants the local processing circuit control of the system bus for a next data transfer cycle if a current memory address is to a different memory module than a previous address request.

BRIEF DESCRIPTION OF THE DRAWINGS

FIGS. 2A and 2B together illustrate a schematic block diagram showing the internal components of a CPU module of FIG. 1 constructed in accordance with the teachings of the present invention.

DETAILED DESCRIPTION OF THE INVENTION

Figure 1:
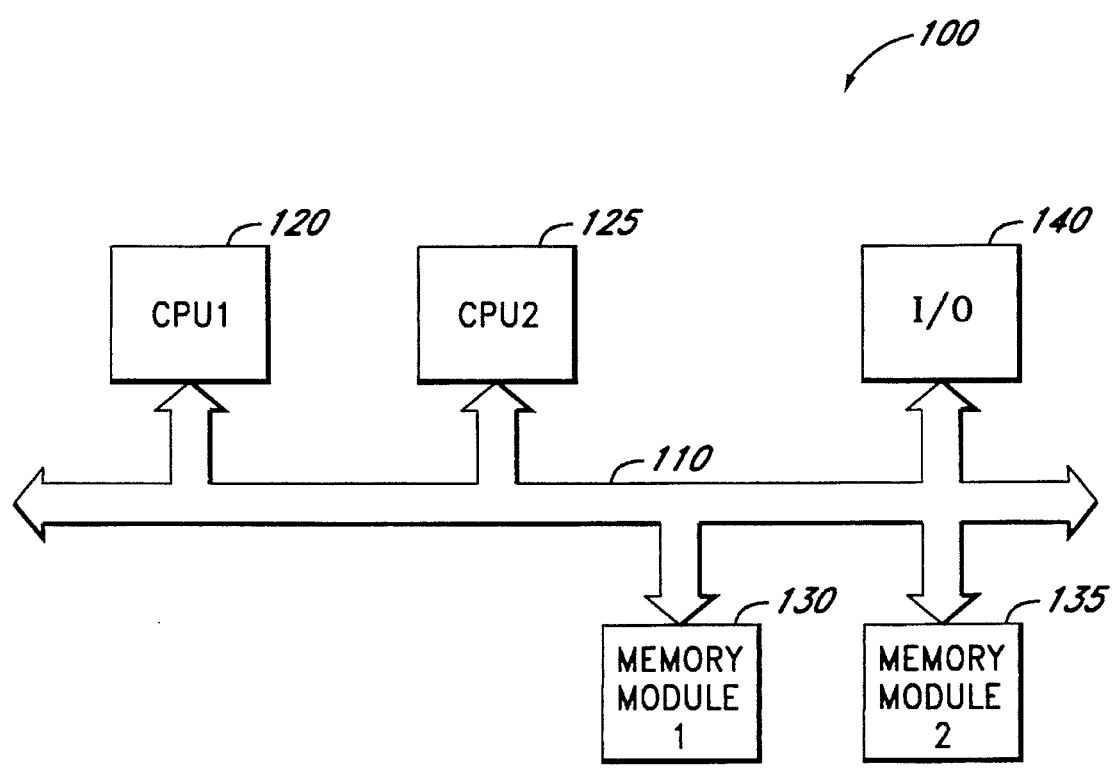
FIG. 1 is a schematic block diagram showing a simplified multiprocessor system including multiple CPUs, as well as multiple interleaved memory modules.

FIG. 1 is a simplified schematic block diagram showing a multiprocessor information processing system 100, which may, for example, comprise a personal computer, a computer mainframe, or other information-processing systems which require multiple processing units. The multiprocessor system 100 includes a system bus 110 which provides communication amongst a first CPU module 120, a second CPU module 125, a first memory module 130, a second memory module 135, and an input/output device 140. It should be noted that the schematic block diagram of FIG. 1 is highly simplified and does not depict many of the accessory circuit elements and buffers typically associated with multiprocessor systems, as will be appreciated by those of ordinary skill in the art. Each of the CPU modules 120, 125 may, for example, comprise 80×486 Intel microprocessors, in addition to a cache memory, conventional bus interface circuitry, and subsystem circuitry (not shown here), which will be described in greater detail with reference to FIGS. 2A and 2B.

Each of the memory modules 130, 135 may, for example, comprise 64 Mbit dynamic random access memory (DRAM) such as those manufactured by Motorola under the Model No. MCM516400. As will be appreciated by those of ordinary skill in the art, the memory module also may comprise a bus interface as well as memory control circuitry (not shown) configured to support interleaving. The input/output device 140 may, for example, comprise a disk drive, a printer, a keyboard or display, or any other input/output devices commonly associated with multiprocessor systems. The system bus 110 may, in one embodiment, comprise a 32-bit or a 64-bit such as a PCI bus.

In operation, each of the CPUs 120, 125 serves as a master unit which controls data transfers on the bus and initiates memory and I/O requests on the system bus 110. When neither CPU 120, 125 has control of the system bus 110, and there are no pending requests within either of the CPUs 120, 125, the bus 110 is in a bus-free phase. If the CPU module 120 or the CPU module 125 wishes to initiate a data transfer via the bus 110, the system bus 110 enters an arbitration phase. Within the arbitration phase, each of the master units on the system bus 110 vies for control of the bus 110. Within a selection phase of the bus 110, control of the bus 110 is granted to that master unit which has the highest priority request. Finally, once one of the master units has control of the bus 110, data or command signals may be transferred via the bus 110 within a command or data phase.

Thus, for example, if the CPU module 120 wishes to access information stored within the memory module 130, the CPU module 120 initiates a request to obtain control of the system bus 110. If there are no other requests to obtain control of the system bus 110, then the CPU module 120 immediately obtains control of the system bus 110. If, however, another master device such as the CPU module 125 also has a pending data request, then the priority of the data request from the CPU module 120 is compared to the priority of the request issued by the CPU module 125. The higher priority request is granted so that the CPU module issuing the higher priority request gains control of the system bus 110. Assuming, for the sake of example, that the CPU module 120 gains control of the bus 110, and wishes to access data stored within the memory module 130, then address data is transmitted by the CPU module 120 to the memory module 130 via the bus 110. The memory module 130 receives the address request and identifies it as an address contained within the memory module 130. The memory module 130 then retrieves the data at the desired address and retransmits this data to the CPU 120 via the bus 110.

Figure 2B:
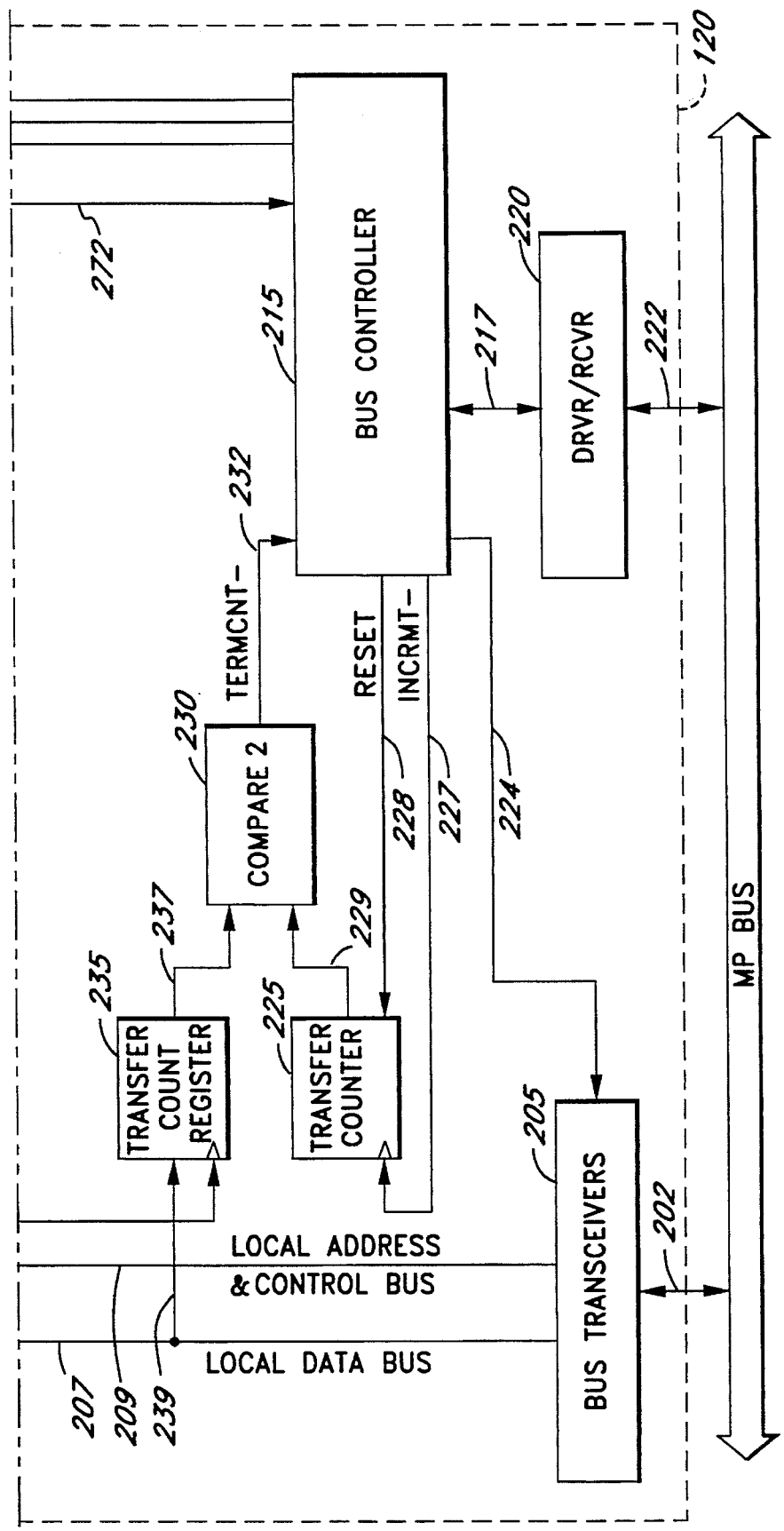

FIGS. 2A and 2B together illustrate a schematic block diagram which shows the internal circuitry of the first CPU module 120 of FIG. 1, constructed in accordance with the teachings of the present invention. It should be understood, of course, that the CPU modules 120, 125 are substantially identical, so that the circuit diagram shown in FIGS. 2A and 2B is also representative of the internal components of the CPU module 125 and any other CPU modules in communication with the system bus 110 (FIG. 1).

The system bus 110 communicates with bus interface transceivers 205 via a bus 202. The bus transceivers 205 communicate with a central processing unit and cache memory, shown within a block 210, via a local data bus 207 and a local address and control bus 209. The CPU and cache memory 210 connect to a bus controller 215 via a bus 212. The bus controller 215 communicates with a driver receiver module 220 via a bus 217, while the driver receiver module 220 connects to the system bus 110 via a bus 222.

The bus controller 215 also connects to the bus transceivers 205 via a bus 224. A transfer counter 225 receives a clock input from the bus controller 215 via an increment line 227. The transfer counter 225 further receives a reset input from the bus controller 215 via a line 228. The transfer counter 225 connects to a compare register 230 via a bus 229, while the output of the compare register 230 connects to the bus controller 215 via a line 232. The compare register 230 receives a second input from a transfer count register 235. The transfer count register 235 receives an input from the local data bus line 207 via a bus 239. The transfer count register 235 further receives an enable, or latch pulse, input from an address decoder 240 via a line 242. The address decoder 240 receives inputs from the local address and control bus 209 via a bus 244. An address latch circuit 245 receives a clock input from the address decoder 240 via a line 248, as well as receiving address bits from the local address and control bus 209 via a bus 250. An interleave register 255 also receives an enable, or latch pulse, input from the address decoder 240 via a line 252. The interleave register 255 further receives inputs from the local data bus 207 via a bus 257. A compare register 260 receives address inputs from the local address and control bus 209 via a bus 261, and also receives inputs from the address latch circuit 245 via a bus 262. The interleave register 255 and the compare register 260 provide inputs to a hog request control circuit 270 via lines 264–266, 267–269, respectively. The hog request control circuitry 270 outputs data to the bus controller 215 via a hog request line 272.

The monitoring subsystem circuitry shown in FIGS. 2A and 2B generally monitors addresses which are to be requested by the CPU 120 to determine if additional sequential address request cycles can be run from the CPU 120 without giving up the system bus 110. Basically, the compare register 260 compares the previously accessed address with the present address to be accessed. If the present address to be accessed is an address within a different memory module than the memory module containing the previously accessed address, then the hog request control circuitry 270 transmits a request to the bus controller 215 via the line 272 to maintain control of the system bus 110. The internal circuitry and operation of the hog control circuitry 270 will be described in greater detail below with reference to FIG. 3. The bus controller 215 then determines if the CPU 120 (i.e., the CPU which currently has control of the system bus 110) has had control of the bus 110 for more than the maximum number of cycles allowed. If the CPU 120 has not had control of the bus 110 for more than the maximum number of allowed cycles, then the bus controller 215 grants control of the bus 110 to the CPU 120 for the next cycle. When the current CPU 120 has control of the bus for successive cycles, the CPU 120 is said to be running in the "hog mode."

The operation of the internal circuitry of the CPU module 120 shown in FIGS. 2A and 2B is described more specifically below. When the CPU module 120 has control of the system bus 110, address and control data are transferred to the bus 110 from the CPU and cache memory 210 via the local address and control bus 209, the bus transceivers 205, and the bus 202. Data is transferred from the CPU and cache memory 210 to the system bus 110 via the local data bus 207, the bus transceivers 205, and the bus 202. Data may also be transferred from the bus 110 to the CPU and cache memory 210.

During any data transfer cycle, the address decoder 240 receives address and control data via the bus 244. The address decoder 240 employs the data provided on the bus 244 to load an interleave value and a maximum transfer count value into the interleave register 255 and the transfer count register 235, respectively. The interleave value indicates the number of memory boards (or modules) that are configured in interleave fashion within the multiprocessor system 100, while the maximum transfer count value indicates the maximum number of cycles which the CPU 120 is able to maintain control of the system bus 110 while in the hog mode. When a transfer count value is to be loaded into the transfer count register 255, the CPU 210 polls the memory modules on the system bus 110 (e.g., the memory modules 130, 135) to determine how many memory modules are configured to interleave. The CPU 210 then supplies the address corresponding to the memory location of the transfer register 255 to the address decoder 240 via the address and control bus 209 and the bus 244. In response to the address input over the bus 244, the address decoder 240 asserts a latch pulse input signal over the line 252. In the meanwhile, the CPU 210 provides the interleave value on the local data bus 207. When the interleave register 255 receives the latch pulse input signal over the line 252, the interleave register 255 latches the interleave value supplied on the local data bus 207 via the bus 257.

In a similar manner, the maximum transfer count value is supplied to the transfer count register 235. Specifically, the CPU 210 supplies the address of the transfer count register 235 to the address decoder 240 via the address and control bus 209 and the bus 244. The address decoder 240 then asserts a latch pulse input signal over the line 242. In the meanwhile, the CPU 210 provides the maximum transfer count value on the local data bus 207. When the transfer count register 235 receives the latch pulse signal from the address decoder 240, the transfer count register 235 latches the maximum transfer count value from the data bus 207 via the bus 239.

The address decoder 240 also latches the lower three address bits A4–A6 into the address latch circuit 245 by means of an enable line 248. The data bits A4–A6 are provided to the address latch circuit 245 from the address and control bus 209 via the bus 250. The address latch 245 holds the address bits A4–A6 for one data transfer cycle.

The address compare circuit 260 receives the lower three data bits A4–A6 via the bus 261 from the local address and control bus 209. The compare circuit 260 also receives the output of the address latch circuit 245 via the output bus 262. The compare circuit then compares inputs from the bus 261 and the bus 262. Because the address latch circuit 245 outputs the address bits A4–A6 one data transfer cycle after the data bits A4–A6 were received in the address latch 245, the data bits provided on the output bus 262 represent the last three address bits of the previously accessed address. Thus, the compare circuit 260 compares the current address (provided on the bus 261) with the previously accessed address (provided on the bus 262) in order to determine if the lowest three address bits are the same or different.

For each of the compared address bit values A4–A6, an output comparison value is provided to the hog request control circuitry 270 via buses 267–269. The line 267 outputs a comparison value based upon the values of A4 and latched A4, while the line 268 outputs a comparison value based upon the values of A5 and latched A5, and the line 269 outputs a comparison value based upon the values of A6 and latched A6. In one embodiment, the comparison circuit 260 comprises a plurality of exclusive OR gates so that if the input bits are the same, the corresponding comparison output is low (i.e., logical "0"), while if the input bits are different, the corresponding comparison output is high (i.e., logical "1"). The hog request control circuitry 270 uses the comparison outputs provided on the lines 267–269 to determine if the presently requested address is to a different memory module than the previously requested address. In the case where the three least significant address bits are the same, the same memory module is being requested. In the case where one or more of the comparison outputs are different, the hog request control circuitry 270 must then use the interleave register 255 to determine if the address is to a different memory module. For the purposes of these examples it is assumed that the memory modules use the least significant address bits to determine which memory module is being accessed. For the case of two memory modules, the bit A4 is used to select between the two modules (e.g., if A4=0 then the first memory module is being accessed, while if A4=1 then the second memory module is being accessed). For the case of four interleaved memory modules, the lower two address bits A5, A4 are used so that these two bits in the combinations 00, 01, 10, 11 are used to select a different memory module.

In a manner similar to the operation of the comparator register 260, the interleave register 255 provides the interleave value to the hog request control circuitry 270 via lines 264–266. In one embodiment, the interleave register 255 outputs an active high signal (logical 1) on the line 264 if the multiprocessor system 100 is configured to have two interleaved memory modules, an active high signal on the line 265 if the multiprocessor system 100 is configured to have four interleaved memory modules, and an active high signal on the line 266 if the multiprocessor system 100 is configured to have eight interleaved memory modules.

Given the interleave value, as well as the output of the compare circuitry 260, the hog request control circuitry 270 can determine whether or not the current address which is to be accessed is within the same memory module as the previously accessed address. This is because successive address memory locations are written in successive interleaved memory modules. Thus, if the interleave value is four (i.e., there are four interleaved memory modules) this means that the lowest two bits A5, A4 are used in combination so that the combinations 00, 01, 10, 11 will each access a different memory module. Thus, in the above example, when the address bits A6–A4 are 110, respectively, for the present address request, and the latched address bits A6–A4 are 010, respectively, for the previous address request, this indicates that the same interleave module is being accessed when the interleave value is four. Whenever an interleave value and an address comparison value are input to the hog request control circuit 270, the hog request control circuit determines if the same memory module is being accessed twice in a row. The internal operation and structure of the hog request control circuitry 270 will be described in greater detail below with reference to FIG. 3.

It should be noted that, although the least significant three bits A4–A6 are used to identify the addresses for purposes of the present invention, more or less than three bits may be used depending upon the number of interleaved memory modules within the multiprocessor system 100. For example, if there are 16 (i.e., $2_4$) interleaved memory modules, then the lowest four address bits should be used to identify the memory module having a given memory location.

Furthermore, the use of A4 as the least significant bit implies that the memory modules are interleaved on a 16-byte boundary for the purposes of the present invention. A higher or lower address bit may be used to increase or decrease the interleave boundary size. For example, if a 32-byte boundary were desired, then the bit A5 would be used as the least significant bit, and bits A6, A7 would be used in conjunction with bit A5 for a system with up to eight interleaved memory modules.

If the hog request control circuit 270 determines that the presently accessed address is not to the same memory module as the previously accessed address, then the hog request control circuitry 270 provides an indication to the bus controller 215 that the CPU module 120 is to retain control of the system bus 110. That is, the CPU module 120 is to "hog" the bus 110.

Upon reception of a hog request on the line 272, the bus controller 215 determines whether or not the CPU module 120 will maintain control of the system bus 110 based upon the input provided along the line 232 from the comparator circuit 230. Basically, the signal on the line 232 indicates whether or not the CPU module 120 has run the maximum allowed number of successive cycles without relinquishing control of the system bus 110. In order to generate an indication signal along the line 232, the comparator circuit 230 receives input from the transfer count register 235 via the bus 237, as well as from the transfer counter 225 via the bus 229.

As stated above, the transfer count register 235 holds the maximum transfer count which is allowable before the CPU module 120 must hand over control of the system bus to another requesting CPU module. If one CPU module has been hogging the system bus 110 for too many cycles, this may be detrimental to the multiprocessor system 100 as a whole, even though the system bus 110 may be running very efficiently, since the processing ability of the other processors on the system bus are compromised. Thus, using a maximum transfer count value is a means of assuring that the other CPU modules on the system bus 110 are able to operate effectively. Although the value of the maximum transfer count value is typically on the order of 4–16, the value of the maximum transfer count value is very application dependent and may vary significantly from application to application. For example, systems which have many processors vying for control of the system bus are likely to have a lower maximum transfer count value than systems having few processors. This is to assure that each processing module does not wait too long and to assure that each processing module has an opportunity to operate effectively. Furthermore, systems which operate in real time are likely to have a lower maximum transfer count value than systems which do not perform real time processing. Of course, a greater maximum transfer count value generally results in greater bus efficiency, so that it is advantageous to choose the highest maximum transfer count value which does result in significantly impaired processor performance.

The other input to the comparator circuit 230 (i.e., the output of the transfer counter 225) keeps track of the number of cycles in which the CPU module 120 is in the hog mode. For each cycle in which the CPU module 120 is running in the hog mode, the bus controller 215 transmits an increment signal to the transfer counter 225 via the line 227. The increment signal increases the value stored within the transfer counter 225 by one bit. Once the value contained in the transfer counter 225 is equal to the value contained within the transfer count register 235, the comparator circuit 230 outputs a terminate-control signal to the bus controller 215 via the line 232.

If the hog request control circuitry 270 initiates a hog request via the line 272 when the terminate-control signal is activated on the line 232, then the bus controller 215 denies control of the CPU module 120 over the system bus 110. In this manner other CPU modules which are vying for control of the system bus 110 are always able to gain access to the system bus within a certain number of data transfer cycles. However, if there is no terminate-control signal initiated on the line 232 and the hog request control circuitry 270 initiates a hog request, then the bus controller grants control of the system bus 110 to the CPU module 120.

When the bus controller 215 grants control of the bus 110 to the CPU module 120, the bus controller 215 transmits a signal to the bus 110 via the bus 217, the driver receiver circuit 220, and the bus 222. As is well known in the art, the system bus 110 typically includes an arbitrator circuit (e.g., a central arbitrator, not shown here). As will be discussed in greater detail below with reference to FIGS. 4 and 5, when the bus controller 215 grants control of the system bus 110 to the local CPU module 120, the bus controller 215 simply continues to assert a "system bus busy signal." The system bus busy signal indicates that a CPU module is currently using the system bus 110. Thus, the central arbitrator circuit of the system bus 110 does not grant control of the bus 110 to any requesting CPU module until the system bus busy signal is no longer asserted. The general operation of the bus controller 215 in conjunction with the system bus 110 will be described in greater detail below with reference to the timing diagrams of FIGS. 4 and 5.

Figure 3:
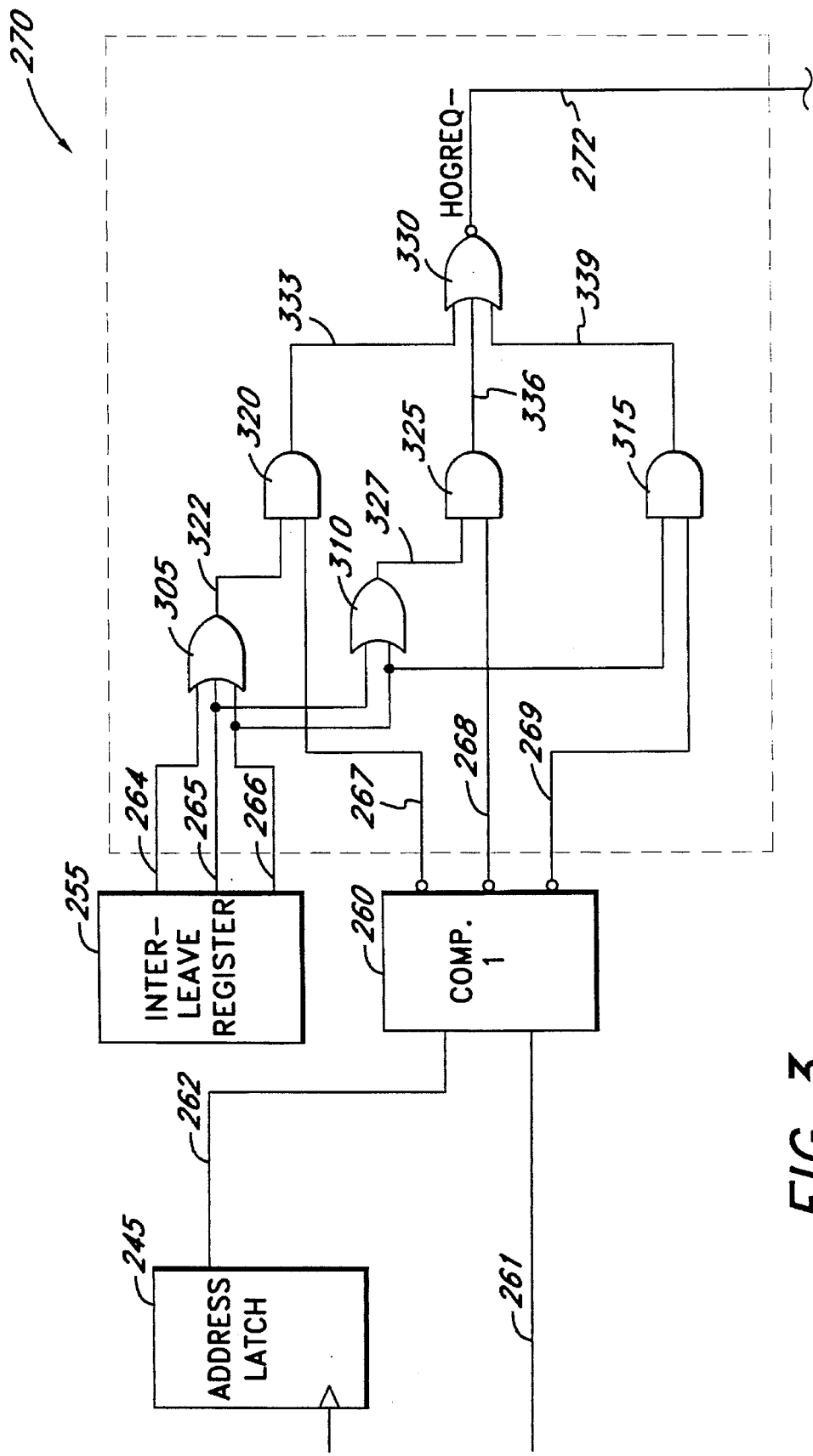
FIG. 3 is a schematic block diagram which shows the main internal circuitry of the hog request control circuitry of FIGS. 2A and 2B.

FIG. 3 shows the main elements associated with the internal circuitry of the hog request control circuit 270. The hog request control circuit 270 includes a three-input OR-gate 305 which receives inputs from the interleave register 255 via the lines 264, 265, 266. A two-input OR-gate 310 receives inputs from the interleave register 255 via the lines 265, 266, while a two-input AND-gate 315 receives a first input from the interleave register 255 via the line 266. The AND-gate 315 receives a second input via the line 269.

An output of the three-input OR-gate 305 serves as a first input to a two-input AND-gate 320 via a line 322. The AND-gate 320 receives a second input from the compare register 260 via the line 267. An output of the OR-gate 310 serves as a first input to a two-input AND-gate 325 via a line 327. The AND-gate 325 receives a second input from the compare register 260 via the line 268.

The outputs of the AND-gates 320, 325, 315 serve as inputs to a three-input NOR-gate 330 via lines 333, 336, 339, respectively. The output of the NOR-gate 330 serves as the hog request signal and is output to the bus controller 215 via the line 272.

In operation, the hog request control circuitry 270 initiates a hog request control signal along the line 272 when it is determined that a different memory module is designated by the pending address than was designated by the last address request issued by the CPU 120. However, if the hog request control circuitry 270 determines that the same memory module will be accessed by the pending address, then no hog request signal is transmitted along the line 272.

For example, assume that the multiprocessor system 100 is configured to have two memory modules 130, 135. Thus, the output of the interleave register 255 will provide an active high signal (i.e., logical 1) on the line 264 while providing a low signal (i.e., logical 0) on the lines 265, 266. Also assume, for the sake of example, that the output of the compare register 260 is logical 1 on the line 267, logical 0 on the line 268, and logical 0 on the line 269. This indicates that the pending address bits A6 and A5 are the same as the latched address bits A6 and A5, while the pending address bit A4 is different than the latched address bit A4. Thus, because this example has only two memory modules, and because for an interleave of two memory modules the address bit A4 is used to select between the two modules, and because the address bit A4 is different from the latched address bit A4, then the previous access and the current access are to different memory modules.

Because an active high signal is applied to the line 264 as an input of the three-input OR-gate 305, the output of the OR-gate 305 is active high. Thus a logical 1 is supplied to the first input of the AND-gate 320 via the line 322. The second input of the AND-gate 320 receives an active high signal via the line 267. Thus, a logical 1 is applied to both inputs of the AND-gate 320 so that the AND-gate 320 outputs a logical 1.

Both inputs to the OR-gate 310 are low so that a logical 0 input is provided to the first input of the AND-gate 325 via the line 327. The second input of the AND-gate 325 receives a low input bit from the line 268. Thus, a logical 0 is applied to both of the inputs of the AND-gate 325 so that the AND-gate 325 outputs a logical 0.

Finally, a low input is applied to the first input of the AND-gate 315 via the line 266 while a low input bit is applied to the second input of the AND-gate 315 via the line 269. Thus, a logical 0 is applied to both of the inputs of the AND-gate 315 so that the AND-gate 325 outputs a logical 0.

Thus, only the AND-gate 320 outputs an active high (logical 1) signal. The active high signal from the AND-gate 320 is received by the NOR-gate 330 via the line 333. The NOR-gate 330 is therefore prompted to output a logical 0, or low signal. Since, in the embodiment described herein, the hog request signal is active low, the logical 0 at the output of the NOR-gate 330 initiates a hog request control signal. Thus, in the case where the pending address differs from the previous address by a single bit A4, and two memory modules are configured to be interleaved, the hog request control circuit 270 generates a hog request.

If, however, the pending address differs from the previous address by bits A5 and/or A6, but with bit A4 not changing state, thereby indicating that the same memory module would be accessed in a system configured with two interleaved memory modules, then the hog request control circuitry 270 should not issue a hog request. Assume, for this example, that the interleave register outputs a logical 1 on the line 264 and logical 0's on the lines 265 and 266 to indicate that two memory modules are configured for interleaving. Further assume in this example, that the output of the compare register 260 is a logical 0 on the line 267, a logical 1 on the line 268 and a logical 0 on the line 269, thereby indicating that the previous address and the pending address differ by two data bits. The OR-gate 305 receives a logical 1 on the line 264 and a logical 0 on each of the lines 265, 266, thereby causing the OR-gate 305 to generate a logical 1 output on the line 322 which serves as the first input to the AND-gate 320. The second input to the AND-gate 320 is a logical 0 as supplied by the line 267 so that the output of the AND-gate 320 is a logical 0 which is applied to the first input of the NOR-gate 330 via the line 333.

The OR-gate 310 receives logical 0 inputs on both the lines 265, 266, thereby causing the OR-gate 310 to output a logical 0 value to the first input of the AND-gate 325 via the line 327. The second input of the AND-gate 325 is a logical 1 supplied by the line 268. Thus, because the AND-gate 325 receives a logical 0 input on the line 327 and a logical 1 input on the line 268, the output of the AND-gate 325 is a logical 0 which is supplied to the second input of the NOR-gate 330 via the line 336.

Finally, the AND-gate 315 receives a logical 0 input along the line 266 and a logical 0 input along the line 269, so that the output of the AND-gate 315 is a logical 0 which is supplied to the third input of the NOR-gate 330 via the line 339. Thus, the NOR-gate 330 receives logical 0's on each of the three input lines 333, 336, 339, so that the NOR-gate 330 outputs a logical 1 on the line 272. This indicates that no hog request is initiated by the hog request control circuitry 270.

Figure 4:
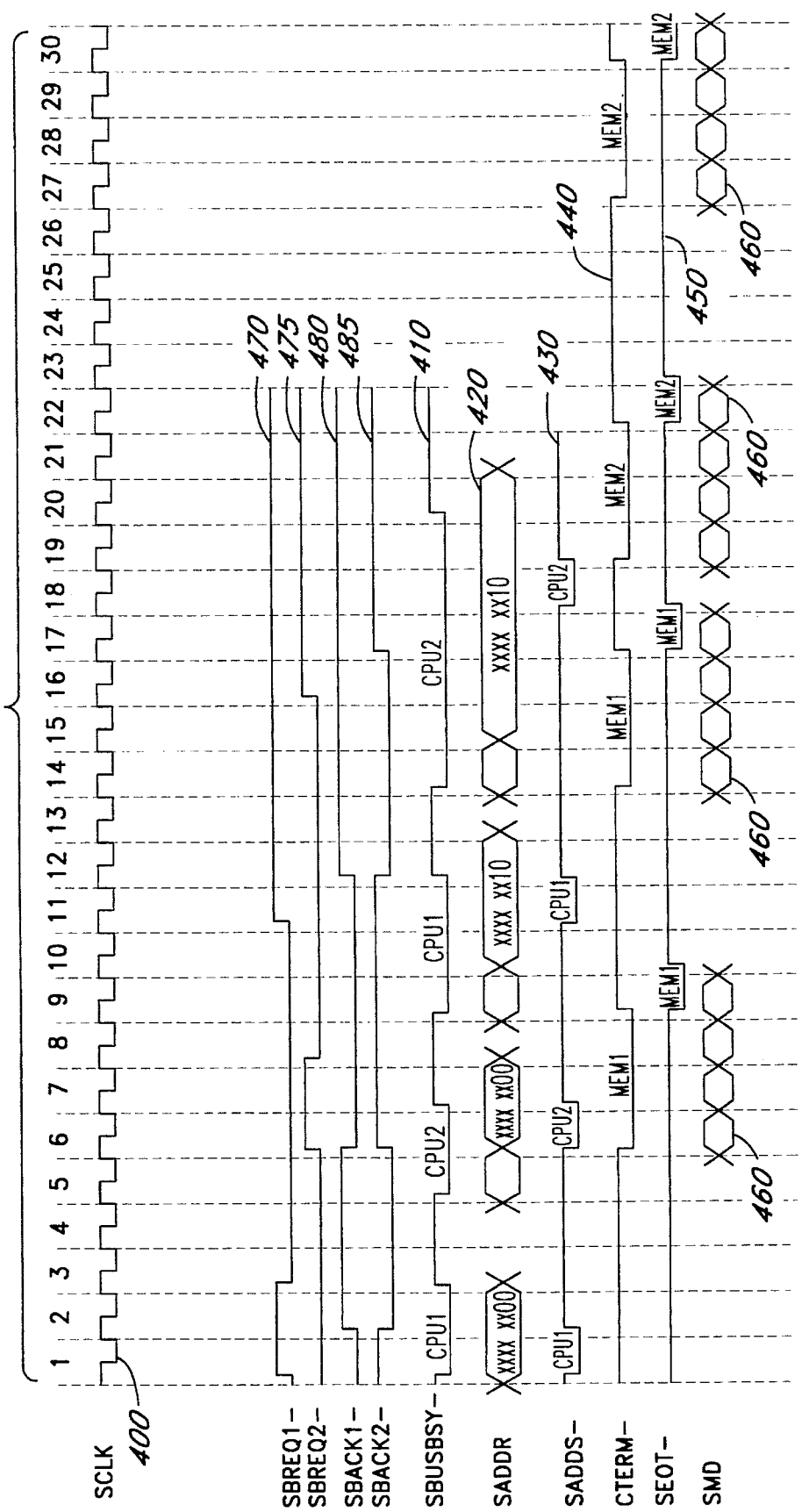
FIG. 4 is a timing diagram which illustrates an exemplary data request and transfer cycle on the system bus of FIG. 1 according to conventional data accessing methods.
Figure 5:
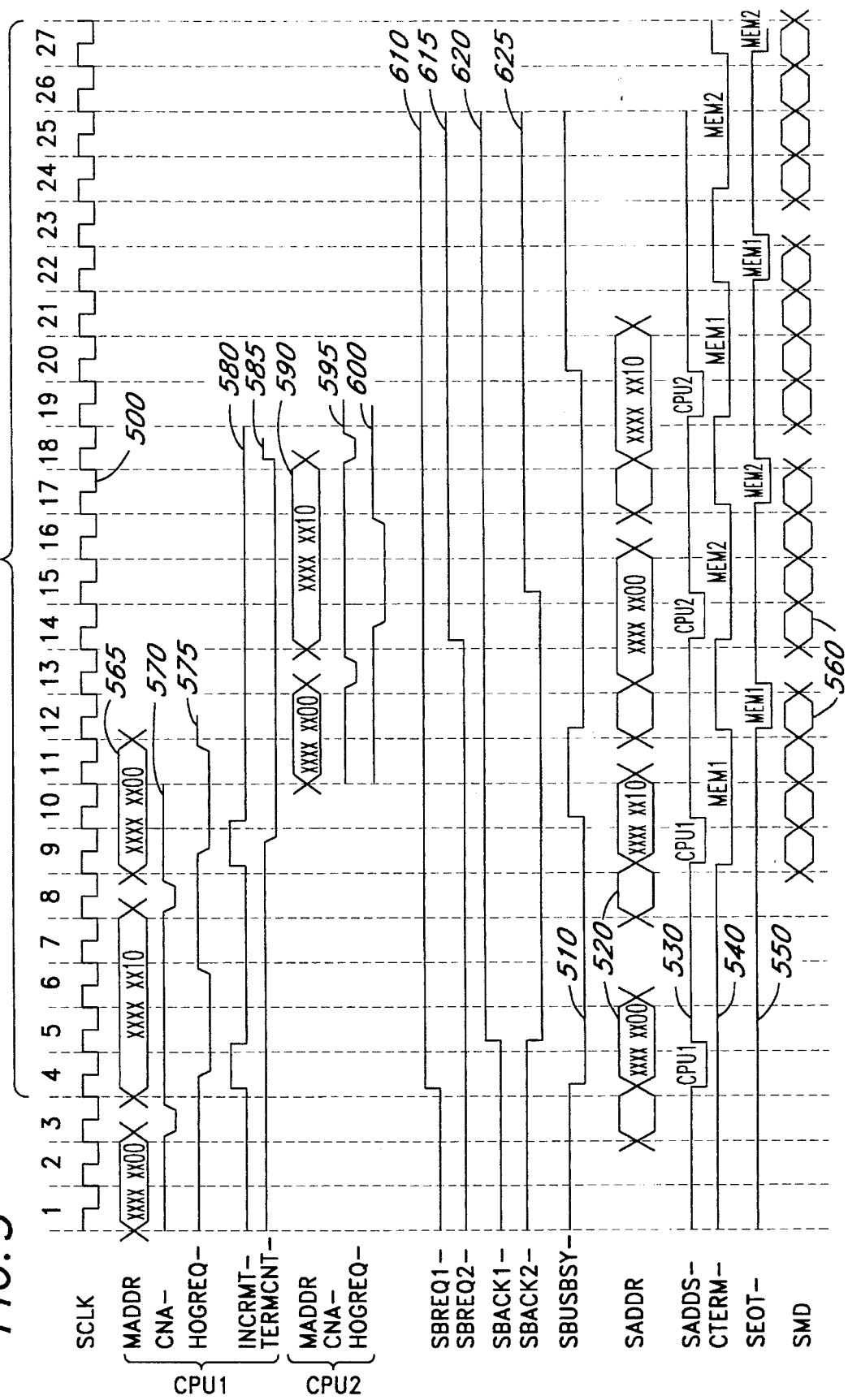
FIG. 5 is a timing diagram which illustrates exemplary data request cycles employing the apparatus and method of the present invention and which shows the improved system bus efficiency obtained by means of the present invention.

FIGS. 4 and 5 are timing diagrams which illustrate the advantage of the present invention over previous systems which do not employ the hog request feature of the present invention. The waveforms depicted in FIG. 4 are exemplary of a data request and transmission sequence which might be observed within a conventional multiprocessor system which does not make use of the teachings of the present invention.

As depicted in FIG. 4, a system clock signal 400 establishes the timing for the entire multiprocessor system 100. Although the multiprocessor system 100 is used for purposes of the following description, it should be understood that the timing signals of FIG. 4 do not represent the operation of a system constructed in accordance with the present invention. Rather, as referenced with respect to the description of FIG. 4, FIG. 1 should be taken as simply a conventional multiprocessor system having none of the advantages of the present invention implemented within the CPU modules 120, 125.

In FIG. 4, a SBUSBSY signal 410, which is the "system bus busy signal" is asserted over the bus 222. The SBUSBSY signal 410 indicates whether the system bus 110 is actively under the control of one of the central processing units 120, 125 of the multiprocessor system 100. A SADDR signal 420, asserted over the bus 222, indicates when address data is provided on the local address and control bus 209 of the CPU currently in control of the system bus 110. As shown in FIG. 4, the last two address bits on the local address and control bus 209 are shown in order to identify the memory module 130, 135 to which the address pertains. A SADDS signal 430, asserted over the bus 222, indicates that a valid address is present on the bus 110. A CTERM signal 440, asserted over the bus 222, indicates that there is valid data on the bus 110 either from the CPU modules 120, 125 to the memory modules 130, 135, or from the memory modules 130, 135 to the CPU modules 120, 125. A SEOT signal 450, asserted over the bus 222, indicates that a data transaction cycle is over (e.g., a data transfer has been completed). A SMD signal 460, asserted over the bus 202, is the valid data being transmitted from one of the memory modules 130, 135 to the CPU in control of the bus 110, or vice versa.

Also shown in FIG. 4 are SBREQ1 and SBREQ2 signals 470, 475, asserted by the bus controller 215 over the bus 222, which indicate that the bus controller for the first CPU module 120 and the bus controller for the second CPU module 125, respectively, are requesting access to the system bus 110. SBACK1 and SBACK2 signals 480, 485 are asserted by the central arbitrator circuit of the system bus 110 over the bus 110. The SBACK1 and SBACK2 signals 480, 485 acknowledge whether the CPU module 120 or the CPU module 125, respectively, has been assigned control of the system bus 110 after the CPU module currently on the system bus 110 has finished. In addition to the signals shown here, other conventional signals, such as a transaction hold, and cache protocol signals, relate to general system timing and operation as will be appreciated by those skilled in the art. However, such signals are not shown here in order to more clearly highlight the signals which are essential to the understanding of the present invention.

As shown in FIG. 4, within the first system clock cycle, the first CPU module 120 initiates an address request along the bus 209, as indicated by the assertion of the SADDS and SADDR signals 430, 420. To more clearly depict the operation of the present invention, the last two address bits of the address request asserted on bus 209 are shown in the SADDR signal 420 (although three or more address bits could also be shown). For purposes of the following description, assume that addresses ending in the last two bits 00 are found within the first memory module 130, while addresses ending in the last two bits 10 are found within the second memory module 135. The address bits shown over cycles 1 and 2 of the SADDR signal 420 indicate that the first memory module 130 contains the memory location accessed by the first address request.

Once the CPU module 120 has asserted the SADDS signal 430, and transmits address data to the first memory module 130, the first memory module 130 recognizes the address on the bus 110 and accesses the data stored within the memory location identified by the address on the system bus 110. The first memory module 130 responds to the request of the CPU module 120 by providing data over the system bus 110 during system clock cycles 6–9, as indicated by the CTERM and SMD signals 440,460. Note that the SMD signal 460 indicates that four cycles of data are transferred over the system bus 110 over the system clock cycles 6–9. The data is received by the CPU module 120 via the system bus 110.

While the memory module 130 provides data over the clock cycles 6–9, the second CPU module 125 initiates an address request as indicated by the assertion of the SADDS and SADDR signals 430, 420. Since the last two address bits shown in the SADDR signal 420 are "00," this indicates that the same memory module (i.e., the first memory module 130) is accessed by the second CPU module 125. Since the memory module 130 is still busy supplying data to the CPU module 120 when the address request is initiated by the CPU module 125, the memory module 130 cannot begin a data transfer cycle to the CPU module 125. Thus, the memory unit 130 cannot provide data to the second CPU module 125 until system cycle 14, five cycles later. This illustrates the lost bus efficiency which occurs whenever the same memory module is accessed in successive data requests.

Eventually, the memory module 130 responds to the CPU 125 by providing four cycles of data over the system bus 110 during the system cycles 14–17. While the memory module 130 was recovering from the initial data request from the first CPU module 120 and was accessing the memory location requested by the second CPU module 125, the CPU module 120 again initiates a data request by asserting the SADDS signal 430 in the system cycle 11. As indicated in the SADDR signal 420, the address of the data request has "10" as the two lowest bits, thereby indicating that the second memory module 135 is to be accessed. Since the second memory module 135 is in the ready state, the second memory module 135 retrieves the requested data while the first memory module 130 provides data over the system bus 110. Thus, when the first memory module 130 has completed the data transfer, the second memory module 135 already has the requested data ready and immediately provides data to the CPU module 120 beginning in the system clock cycle 19. Data is therefore provided to the CPU module 120 over the system bus 110 during the system cycles 19–22.

As the second memory module 135 is providing data to the first CPU module 120, the second CPU module 125 again asserts the SADDS signal 430 in the clock cycle 18 to indicate that the CPU module 125 is making another memory request. The SADDR signal 420 indicates that the address of the data requested by the CPU module 125 has the two lowest address bits "10," so that the second memory module 135 is to be accessed. However, since the second memory module 135 is still busy providing data over the system bus 110, the memory module 135 must recover before the data requested by the CPU module 125 can be transmitted to the over the system bus 110 during the cycles 27–30.

As can be seen from the SMD signal 460 in FIG. 4, 30 system clock cycles are used to provide four memory accesses and transfers for a conventional multiprocessor system which does not implement the teachings of the present invention. Thus, since four clock cycles of data are transferred for each memory transfer, the number of cycles during which valid data is provided over the system bus 110 is 16 out of 30 possible system cycles. This translates into a system bus efficiency of approximately 53 percent.

The waveforms depicted in FIG. 5 are exemplary of a data request and transmission sequence which might be observed within an improved multiprocessor system which makes use of the teachings of the present invention.

As depicted in FIG. 5, a system clock signal 500 establishes the timing for the entire multiprocessor system 100 (FIG. 1) as constructed in accordance with the teachings of the present invention. A SBUSBSY signal 510, which is the "system bus busy signal" is asserted over the bus 222. The SBUSBSY signal 510 indicates whether the system bus 110 is actively under the control of one of the central processing units 120, 125 of the multiprocessor system 100. A SADDR signal 520, asserted over the bus 222, indicates when address data is provided on the local address and control bus 209 of the CPU currently in control of the system bus 110. As shown in FIG. 5, the last two address bits on the local address and control bus 209 are shown in order to identify the memory module 130, 135 to which the address pertains. A SADDS signal 530, asserted over the bus 222, indicates that a valid address is present on the bus 110. A CTERM signal 540, asserted over the bus 222, indicates that there is valid data on the bus 110 either from the CPU modules 120, 125 to the memory modules 130, 135, or from the memory modules 130, 135 to the CPU modules 120, 125. A SEOT signal 550, asserted over the bus 222, indicates that a data transaction cycle is over (e.g., a data transfer has been completed). A SMD signal 560, asserted over the bus 202, is the valid data being transmitted from one of the memory modules 130, 135 to the CPU in control of the bus 110, or vice versa.

In addition to the signals 500–560 which are system-wide throughout the multiprocessor system 100 constructed in accordance with the present invention, signals which are local to each of the CPU modules 120, 125 are depicted in FIG. 5. Signals local to the CPU module 120 include a MADDR signal 565 asserted over the bus 209 (FIGS. 2A and 2B), which is the pending address to be asserted by the CPU module 120. A CNA signal 570 asserted over one of the lines 212, indicates that the bus controller 215 has requested the next address so that the CPU 210 (FIG. 2A) drives the MADDR signal 565 onto the local address and control bus 209. A HOGREQ signal 575 asserted over the line 272 indicates when the CPU module 120 wishes to retain control of the system bus into the next data transfer cycle. An INCRMT signal 580 asserted over the line 227 indicates that a data transfer cycle has been performed by the local CPU module in the hog mode. Finally, a TERMCNT signal 585 asserted over the line 232 indicates that the local CPU module has had control of the system bus 110 in the hog mode for the maximum number of allowed data transfer cycles. Signals local to the CPU module 125, and depicted in FIG. 5 include a MADDR signal 590 asserted over the local address and control bus 209, which is the pending address to be asserted by the CPU module 125. A CNA signal 595 asserted over one of the lines 212, indicates that the bus controller 215 has requested the next address so that the CPU 210 drives MADDR signal 590 onto the address and control bus 209. Finally, a HOGREQ signal 600 asserted over the line 272 indicates when the CPU module 125 wishes to retain control of the system bus 110 into the next data transfer cycle.

FIG. 5 also depicts the SBREQ1, SBREQ2, SBACK1 and SBACK2 signals 610–625, which are substantially identical and perform substantially the same functions as the SBREQ1, SBREQ2, SBACK1 and SBACK2 signals 470–485, respectively, depicted in FIG. 4. In addition to the signals shown here, other conventional signals, such as a transaction hold and cache protocol signals, relate to general system timing and operation as will be appreciated by those skilled in the art. However, such signals are not shown here in order to more clearly highlight the signals which are essential to the understanding of the present invention.

As shown in FIG. 5, within the first system clock cycle, the first CPU module 120 initiates an address request along the bus 209, as indicated by the assertion of the SADDS and SADDR signals 530, 520. As with the description referring to FIG. 4, assume that addresses ending in the last two bits 00 are found within the first memory module 130, while addresses ending in the last two bits 10 are found within the second memory module 135. The address bits "00" shown over system clock cycles 4 and 5 of the SADDR signal 520 indicate that the first memory module 130 contains the memory location accessed by the first address request.

Once the CPU module 120 has asserted the SADDS signal 530, and transmits address data to the first memory module 130, the first memory module 130 recognizes the address on the bus 110 and accesses the data stored within the memory location identified by the address on the system bus 110. The first memory module 130 responds to the request of the CPU module 120 by providing data over the system bus 110 during system clock cycles 9–12, as indicated by the CTERM and SMD signals 540, 560. Note that the SMD signal 560 indicates that four cycles of data are transferred over the system bus 110 over the system clock cycles 9–12. The data is received by the CPU and cache memory 210 (FIG. 2A) via the local data bus 207.

As the first CPU module 120 initiates the first address request in the system clock cycle 4, the comparator register 260 (FIG. 2A) outputs a comparison signal within the same clock cycle on the lines 267–269. The comparison signal is based upon a comparison of the last address to be asserted and the next address to be asserted by the local CPU module (i.e., the CPU module 120). Since, as depicted in FIG. 5, the signal on the lines 267–269 indicates that the next address is to be found in a different memory module (i.e., the second memory module 135), the HOGREQ signal 575 is asserted via the line 272. Thus, the CPU module 120 does not release the SBUSBSY line 510. Rather, the CPU module 120 again initiates a data request by asserting the SADDS signal 530 in the system cycle 9. As indicated in the SADDR signal 520, the address of the data request has "10" as the two lowest bits, thereby indicating that the second memory module 135 is to be accessed. Since the second memory module 135 is in the ready state, the second memory module 135 retrieves the requested data while the first memory module 130 provides data over the system bus 110. Thus, when the first memory module 130 has completed the data transfer, the second memory module 135 already has the requested data ready and immediately provides data to the CPU module 120 beginning in the system clock cycle 19. Data is therefore provided to the CPU module 120 over the system bus 110 during the system cycles 14–17. This illustrates the increased efficiency provided by the subsystem monitoring circuit of the present invention over conventional multiprocessor systems.

As shown in FIG. 5, the CPU module 120 releases the system bus 110 as indicated by the SBUSBSY signal 510. There are three reasons why the CPU module 120 would release the system bus 110. First, there may be no further address requests pending within the CPU module 120. Second, the next pending address request may be to the same memory module as the last accessed memory module. Third, the CPU module 120 may have had control of the system bus for the maximum number of allowed cycles so that a terminate control signal is generated along the line 232.

The waveforms depicted in FIG. 5 illustrate the case where the CPU module 120 has run the maximum allowed number of data transfer cycles while in the hog mode. The INCRMT signal 580 causes the count within the transfer counter 225 (FIG. 2B) to advance by one. When the value in the transfer counter 225 becomes equal to the value in the transfer count register 235, this indicates that the maximum allowed number of data transfer cycles has been run by the CPU module 120. Consequently, as indicated by the transition of the TERMCNT signal 585 in clock cycle 9, a terminate control signal is transmitted to the bus controller 215 via the line 232. This results in the release of the system bus 110 by the CPU module 120, as indicated by the transition of the SBUSBSY signal 510 in clock cycle 10. In addition, when the terminate control signal is transmitted to the bus controller 215, the bus controller 215 resets the transfer counter 225 by means of a reset pulse (not shown) transmitted over the line 228.

As the second memory module 135 is providing data to the first CPU module 120, the second CPU module 125 asserts the SADDS signal 530 in the clock cycle 14 to indicate that the CPU module 125 is making a memory request. The SADDR signal 520 indicates that the address of the data requested by the CPU module 125 has the two lowest address bits "00," so that the first memory module 130 is to be accessed. Thus, since the request is issued from the CPU module 125 while the second memory module 135 is still busy providing data over the system bus 110, the first memory module 130 is able to access the requested data while the system bus 110 is being used to transfer data. When the second module memory 135 is finished transferring data, the first memory module 130 has the requested data ready to transfer immediately to the requesting CPU module 125.

Once again, as the second CPU module 125 initiates the address request in the system clock cycle 18, the comparator register 260 (FIG. 2A) outputs a comparison signal within the same clock cycle on the lines 267–269. The signal on the lines 267–269 is based upon a comparison of the last address to be asserted and the next address to be asserted by the local CPU module (i.e., the CPU module 125). Since, as shown in FIG. 5, the signal on the lines 267–269 indicates that the next address is to be found in a different memory module (i.e., the second memory module 135), the HOGREQ signal 600 is asserted via the line 272. Thus, the CPU module 125 does not release the SBUSBSY line 510. Rather, the CPU module 125 again initiates a data request by asserting the SADDS signal 530 in the system cycle 19. As indicated in the SADDR signal 520, the address of the data request has "10" as the two lowest bits, thereby indicating that the second memory module 135 is to be accessed. Since the second memory module 135 is in the ready state, the second memory module 135 retrieves the requested data while the first memory module 130 provides data over the system bus 110. Thus, when the first memory module 130 has completed the data transfer, the second memory module 135 already has the requested data ready and immediately provides data to the second CPU module 125 beginning in the system clock cycle 24. Data is therefore provided to the second CPU module 125 over the system bus 110 during the system cycles 24–27. This illustrates the increased efficiency provided by the subsystem monitoring circuit of the present invention over conventional multiprocessor systems.

As can be seen from the SMD signal 560 in FIG. 5, 24 system clock cycles (cycles 4–27) are used to provide four memory accesses and transfers for an improved multiprocessor system 100 which implements the teachings of the present invention. Thus, since four clock cycles of data are transferred for each memory transfer, the number of cycles during which valid data is provided over the system bus 110 is 16 out of 24 possible system cycles. This translates into a system bus efficiency of approximately 67 percent.

The present invention may be embodied in many forms and variations obvious to those of ordinary skill in the art without departing from its spirit or essence. For example, the four lowest address bits could be used to determine if the local CPU module is accessing the same memory unit. Also, the maximum number of data transfer cycles which a given CPU module can run while in the hog mode may be calculated on a variable basis (e.g., as a function of the priority of the requests issued by other CPU modules) rather than determined as a fixed number for a given application. Furthermore, it should be understood that the present invention is not limited to use in a multiprocessor system. So long as more than one module (not necessarily a processor module) is capable of mastering the system bus 110 (i.e., issuing a request for control of the system bus), the benefits of the present invention will be achieved. For example, if the second CPU module 125 was eliminated and the system bus 110 was shared only between the I/O module 140 and the first CPU module 120, the present invention provides the same benefits as applicable to the multiprocessor. Namely, the sharing of the system bus 110 between the single processor 120 and the bus mastering I/O device 140 also provides optimized bus efficiency. Additionally, while it is advantageous to implement the present invention within all of the bus mastering modules, this is not necessary to achieve increased bus efficiency. That is, even a single bus mastering module which includes the hog request control circuitry 270, and other associated features of the present invention, provides an increase of overall system bus efficiency in comparison to a system which does not implement the present invention in any of its bus mastering modules. Thus, the preceding description should be construed as illustrative and not restrictive. Accordingly, the scope of the invention should be interpreted in light of the appended claims and all equivalents thereto.

I claim:

1. An information processing circuit having multiple bus mastering devices and multiple interleaved memory modules, said circuit comprising:

a system bus;

first and second interleaved memory modules in communication with said system bus; and first and second central processing unit (CPU) modules in communication with said interleaved memory modules via said system bus, each of said modules comprising:

a CPU and a cache memory, wherein said CPU generates address requests for accessing selective ones of said interleaved memory modules, and transmits and receives data to and from said interleaved memory modules;

an address decoder circuit in communication with said CPU and cache memory, wherein said address decoder circuit receives address and control data indicative of the presence of a pending address request generated by said CPU, said address and control data further indicating the number of said interleaved memory modules on said system bus;

an address latch circuit which latches pending addresses generated by said CPU in response to a command from said address decoder circuit;

an address comparator circuit which compares addresses output by said address latch circuit and said pending address requested by said CPU;

an interleave register in communication with said CPU and said address decoder, wherein said interleave register receives data indicating the number of said interleaved memory modules on said system bus;

control circuitry which receives inputs from said address comparator circuit and said interleave register and, based upon said inputs, generates a signal requesting control of said system bus when said pending address request is issued to a different memory module from the memory module accessed by the previous address request issued by said CPU; and a bus controller which receives said signal generated by said control circuitry and causes said CPU module to retain control of said system bus when said control circuitry requests control of said system bus, or releases control of said system bus when said control circuitry does not request control of said system bus.

2. A processing circuit as defined in claim 1, wherein said CPU modules further comprise:

a transfer count register which stores a transfer count value;

a transfer counter which stores a counter value that is incremented each time a data transfer cycle is performed between said CPU and one of said interleaved memory modules; and a transfer count comparator circuit which compares said transfer count value stored in said transfer count register and said counter value stored in said transfer counter, and provides a terminate control signal to said bus controller if said counter value is equal to said transfer count value.

3. A monitoring subcircuit for use in a bus mastering module within a multimaster system having a system bus in communication with interleaved memory modules, and wherein said bus mastering module generates address requests on said system bus for accessing selected ones of said interleaved memory modules, said subcircuit comprising:

an address locator circuit which, before a pending address is placed onto said system bus, determines if a corresponding pending address request within said bus mastering module is directed to a memory module which received an immediately preceding address request generated by said bus mastering module; and a control circuit which indicates that said bus mastering module should retain control of said system bus when said address locator circuit determines that said pending address request is directed to accessing a different memory module than said memory module which received said immediately preceding address request generated by said bus mastering module.

4. A monitoring subcircuit as defined in claim 3 wherein said bus mastering module comprises a processor module.

5. A monitoring subcircuit as defined in claim 3, further comprising a terminate control circuit which generates a signal indicating that said bus mastering module should release control of the bus once the bus mastering module has run a maximum number of consecutive data transfers without relinquishing control of said system bus.

6. An information processing system including multiple bus mastering modules, said system comprising:

a system bus;

a plurality of memory modules in communication with said system bus; and a plurality of bus mastering modules, wherein each of said bus mastering modules includes a subcircuit which, before an address directed to one of said memory modules is placed on said system bus, monitors said address requested by said bus mastering modules, and wherein said subcircuit grants the local bus mastering circuit control of the system bus for a next data transfer cycle if a current memory address is to a different memory module than a previous address request.

7. An information processing system as defined in claim 6, wherein at least one of said bus mastering modules comprises a processor module.

* * * * *